Feb. 29, 1944.     A. E. MAAGE, JR     2,342,877
RETRACTIBLE TAIL PIECE FOR DAMPER REGULATORS
Filed May 10, 1941
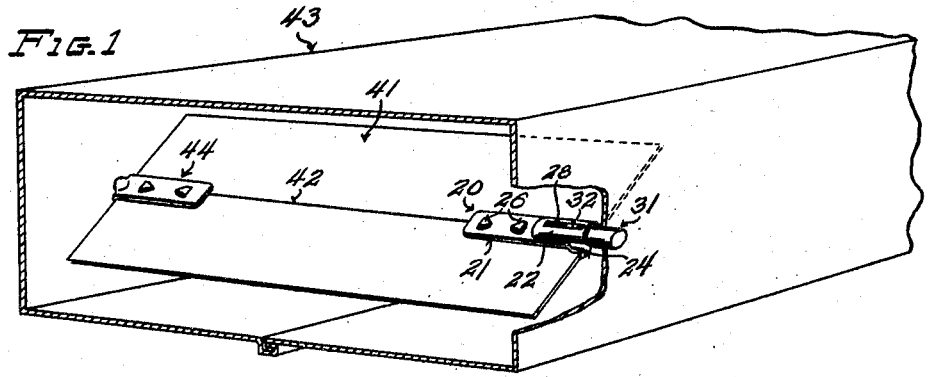
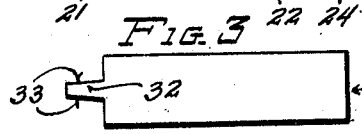
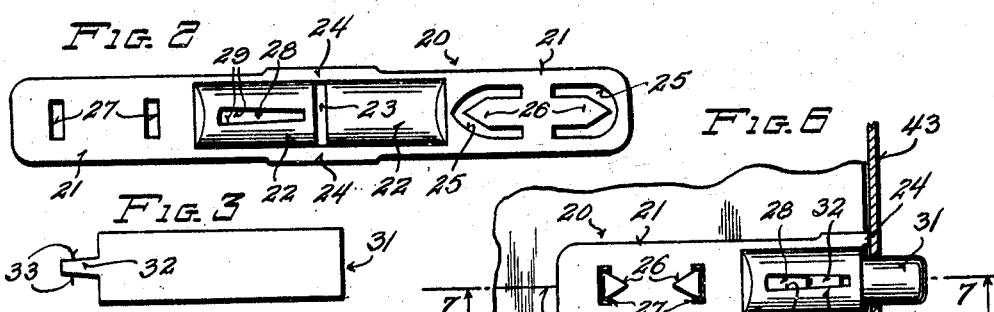
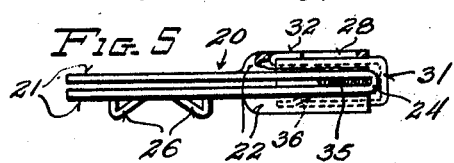
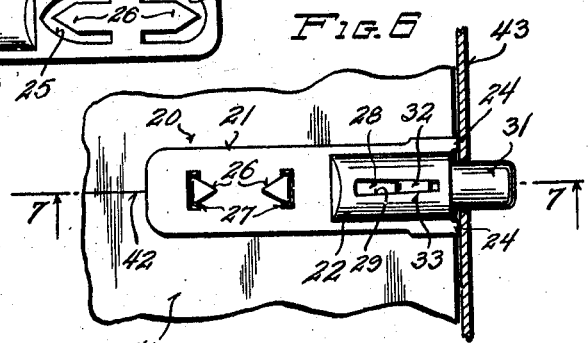
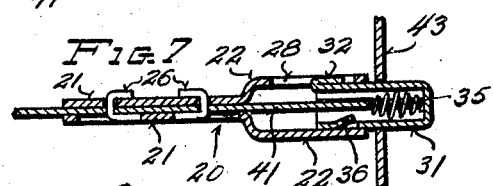
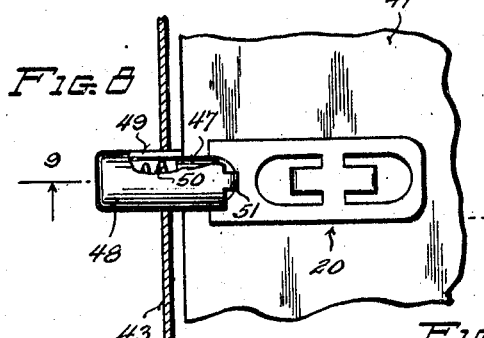
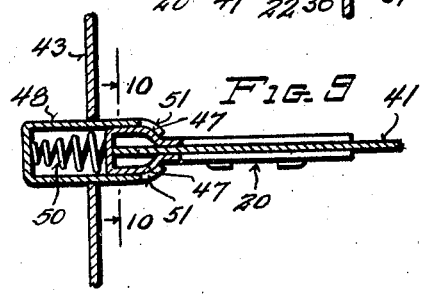
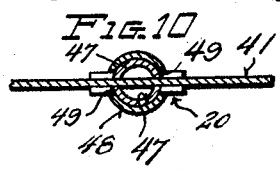
INVENTOR
*Alfred E. Maage Jr.*
BY
*Erwin B. Eiring*
ATTORNEY Patented Feb. 29, 1944

2,342,877

UNITED STATES PATENT OFFICE 2,342,877

RETRACTABLE TAILPIECE FOR DAMPER REGULATORS

Alfred E. Maage, Jr., Milwaukee, Wis.

Application May 10, 1941, Serial No. 392,894

8 Claims. (Cl. 251—11)

This invention relates to damper regulators, and more particularly to a new and improved retractable tail piece therefor.

The primary object of the present invention resides in the provision of a new and improved sheet metal tail piece including a retractable portion.

A further object resides in the provision of a new and improved retractable tail piece that permits the installation of a damper in an air conduit without requiring either the bending of the damper or the springing of the air conduit.

A further object resides in the provision of a new and improved tail piece including a retractable thimble or bearing portion adapted to be spring urged into frictional locked position upon application of the damper to the air conduit, to provide a means for releasably retaining the damper to permit pivotal adjustment thereof to regulate the flow of air through the conduit.

Another object lies in the provision of a new and improved retractable tail piece for dampers constructed in a manner to be rattleproof.

Another object lies in the provision of new and improved tail piece including a cylindrical guide means including a tapered slot for receiving a tapered wedge formed on the retractable thimble or bearing portion, the tapered slot and tapered wedge cooperating under the action of a coil spring to frictionally lock the retractable bearing portion of the tail piece in its extended position.

According to this invention, a new and improved sheet metal rattleproof tail piece including a retractable bearing has been provided which permits the insertion of a damper into an air conduit without requiring the damper to be bent or the air conduit to be sprung and which operates automatically to frictionally lock the bearing in extended position upon application of the damper to the air conduit.

Other objects and advantages will become manifest from the following description of illustrative embodiments of the present invention.

In the drawing—

Figure 1 is a perspective view of an air conduit equipped with an adjustable damper element provided with the usual head piece and a retractable tail piece, constructed in accordance with the teachings of the present invention;

Fig. 2 is a top plan view of a partially shaped sheet metal blank from which the body portion of the tail piece is produced;

Fig. 3 is a pattern view of a sheet metal blank from which the retractable portion of the tail piece is formed;

Fig. 4 is a side elevational view of a completely formed retractable portion of the tail piece;

Fig. 5 is a side elevational view of a completely assembled tail piece with a portion broken away to show structural detail;

Fig. 6 is a fragmentary elevational view of a portion of the damper showing the tail piece in elevation and the wall of the air conduit in section.

Fig. 7 is a sectional view taken on the line 7—7 of Fig. 6 showing the means for anchoring the retractable tail pieces on the damper and the means for utilizing the damper element to render the coil spring operative to yieldably urge the retractable portion of the tail piece toward its extended position wherein it is frictionally locked against retracting movement;

Fig. 8 is a fragmentary elevational view of a portion of a damper showing a modified form of retractable tail piece in elevation, with a portion broken away to disclose hidden structure, and the wall of the air conduit in section;

Fig. 9 is a sectional view taken on the line 9—9 of Fig. 8 showing the structure of the modified form of retractable tail piece; and Fig. 10 is a vertical sectional view taken on the line 10—10 of Fig. 9 showing the formation of the guide means for the retractable portion of the tail piece.

The invention herein disclosed and claimed is predicated upon and forms a continuation in part of my copending patent application for damper regulators, filed July 15, 1939, under Serial Number 284,637, now Patent No. 2,285,829, granted June 9, 1942.

The preferred form of retractable tail piece for damper regulators is shown in Figures 1 to 7, inclusive, of the accompanying drawing.

Figure 2 of the drawing discloses a top plan view of a partially shaped sheet metal stamping, cut from a milled flat wire, which forms the body portion of a tail piece 20. The body portion of the tail piece 20 comprises a pair of end portions 21, a pair of intermediate portions 22 and a central transversely disposed relatively narrow opening 23 bounded on each end by a narrow strip or connector 24 which serves to retain the blank in one piece. One of the end portions 21 is provided with a pair of longitudinally disposed openings 25 each delineating a tang 26. The other end portion 21 is provided with a pair of longitudinally spaced transversely disposed tang receiving slots 27. The intermediate portions 22 of the body of the tail piece 20 are raised by a stamping process into semi-cylindrical shape for a purpose to be hereinafter more specifically described. One of the semi-cylindrical intermediate portions 22 of the body of the tail piece 20 is provided with a longitudinally disposed tapered slot 28 having sides 29 that converge from the wide end of the slot adjacent to end portion of the blank to the narrow end of the slot that lies adjacent the central transversely disposed opening 23 formed in the blank.

A retractable thimble or bearing portion 31 of the tail piece 20 is formed from a blank shown in pattern in Fig. 3 of the drawing. It should be noted that one end of the otherwise rectangular blank is provided with an extended portion forming a tapered lug 32 having sides 33 that converge from a wide end at the blank to a narrow end at the tip of the lug. The blank shown in Fig. 3 is drawn to the shape shown in Fig. 4 wherein it forms the completed retractable thimble or bearing element. In the process of shaping the thimble, the longitudinal sides of the blank cooperate to form slots 34 disposed diametrically of the thimble and extending longitudinally thereof from the open to the closed end. After the thimble has been formed, the lug 32 is bent back upon the outer surface of the body of the thimble as shown in Fig. 4. A barrel spring 35 is then inserted into the thimble and a tang 36 is struck inwardly, from the side of the thimble opposite the lug 32, to provide a means for retaining the spring in the retractable portion 31 of the tail piece 20 prior to its application to the damper. After the retractable portion 31 of the tail piece is completely formed, the body portion thereof is partially folded, on its transverse medial line, and after the retractable thimble or bearing portion has been positioned with the tapered lug 32 disposed within the tapered slot 28 of the tail piece 20 the folding operation is completed to produce the finished tail piece as it appears in Fig. 5 of the drawing.

The method of applying the tail piece to a damper 41 is extremely simple. Under normal conditions, the workman applies a scribe line 42 along the longitudinal center of the damper, in the present instance the damper is to be applied to an air conduit 43 of rectangular form (as shown in the drawing) or to a diameter line in the event that the damper is to be applied to circular pipe. The spaced parallelly disposed end portions of the tail piece 20 are adapted to slidably receive an edge of the damper 41. The tail piece may be slid to a position in which the points of the tangs 26 lie directly above the scribe line 42 when the edge of the damper is in contact with the connector strips 24 of the tail piece 20. To effect this proper positioning of the tail piece on the damper, it should be noted that the edge of the damper engages the inner end of the barrel spring 35 putting the same under compression and thereby causing the thimble or bearing element 31 to be urged outwardly toward an extreme position. After the tail piece 20 has been properly positioned upon the damper, it may be securely anchored thereon merely by striking the upstanding portions of the tangs 26 with the blow of a hammer to drive the pointed tangs 26 through the damper 41 and the aligned tang receiving slots 27 formed in the cooperating portion of the tail piece. To complete the anchoring operation the damper is turned over and the points of the tangs are hammered against the surface of the portion 21 of the tail piece. During the process of piercing the damper, the tangs 26 will deform the metal of the damper against the ends and sides of the slots 27 and when the tangs 26 are clinched the resulting anchorage between the damper and the tail piece is absolutely rattle-proof.

Any suitable head piece 44, but preferably one of the type illustrated in my copending patent application to which reference has been previously made, may be applied to the edge of the damper opposite that on which the tail piece 20 is applied.

After the head and tail pieces 44 and 21 respectively, have been properly positioned and anchored on the damper 41, the damper may be applied to the air conduit 43 by sliding the damper 41 into the air conduit until the outer end of the head piece 44 can be projected through a bearing hole formed in the side wall of the conduit. With the end of the head piece 44 projecting through the bearing hole, the end of the damper on which the retractable tail piece 20 is mounted may be slid along the conduit until it reaches a position in which the retractable thimble or bearing portion 31 comes into alignment with the bearing hole formed in the other side wall of the air conduit at which time, the thimble or bearing portion 31 will snap through the hole, under action of the then completely compressed barrel spring 35, with sufficient force to drive the wedge or tapered lug 32 into frictionally locked contact with the tapered slot 28 formed in the intermediate portion 22 of the tail piece 20. It should be noted at this point that the two semi-cylindrical portions 22 of the tail piece cooperate when the same is folded upon itself to form a cylindrical guide for the retractable thimble or bearing portion 31. Furthermore, it should be noted that the degree of taper of the lug 32 and the slot 28 are identical so that the sides 29 of the slot 28 and the sides 33 of the lug 32 provide for full surface contact between the wedge and the slot to insure adequate frictional contact therebetween to lock the bearing 31 in its extended position. A further particular that may be emphasized at this point lies in the formation of the tail piece 20 in such a manner that the slots 34 formed in the thimble or bearing portion 31 of the tail piece 20 lie in alignment with the damper receiving slot formed between the folded portions of the body portion of the tail piece 20. This structure permits the edge of the damper to lie in close proximity with the wall of the conduit and yet affords ample bearing surface for the thimble within its guide member since the slots 34 in the thimble allows the thimble to be pressed wholly within the confines of the air conduit 43 against the action of the barrel spring 35.

A modified form of retractable tail piece 20 is shown in Figs. 8, 9 and 10 of the drawing. The retractable tail piece shown in these figures of the drawing partakes generally of the characteristics of the preferred form previously described. The principal difference between the two forms lies in structural detail. The three main differences lie in the fact that the damper 41 does not form an active part in the loading of the spring means for urging the retractable portion of the tail piece that the retractable portion of the tail piece in the modified form is disposed to slide on the outer surface of the guide means rather than within it, and that it does not include a frictional means for locking the bearing in its extended position.

The body portion of the tail piece 20 shown in Figs. 8, 9 and 10 is fashioned in a manner similar to that of the preferred form save for the fact that the central portion of the blank is solid and that semi-cylindrical portions 47 formed thereon provide a cylindrical guide, when the blank is folded, on which a thimble or bearing portion 49 is slidably receivable. The thimble or bearing portion 48 is provided with a diametrically disposed slot 49 adapted to permit the retractable portion 48 to slide over the body portion of the tail piece 20 when the bearing portion is in its inner or retracted position. A conical coil spring is inserted between the end of the tail piece 20 and the inner end surface of the thimble 48 to provide a means for normally urging the thimble or bearing to its outer extreme position which is regulated by the contact of inwardly turned tangs 51, formed on the open end of the bearing portion, with the cylindrical guide 47 formed on the tail piece 20.

From the foregoing description of the present invention it will be noted that a new and improved sheet metal retractable tail piece has been provided for damper regulators, that is simple in form, inexpensive in manufacture, and of improved design capable of simple application to a damper and providing a highly desirable rattleproof structure.

While the invention has been described in considerable detail in the foregoing specification, it is understood that various changes may be made in its embodiment without departing from or sacrificing any of the advantages hereinafter claimed.

I claim:

1. A retractable tail piece for damper regulators comprising a folded sheet metal body portion including a pair of flat damper engaging portions disposed to receive a damper between them, a retractable bearing element, guide means on said folded sheet metal body portion for telescopically receiving said retractable bearing element, a fixed abutment member, and a coil spring disposed within said bearing element having one end thereof in contact with said fixed abutment member and the other end thereof in contact with said bearing element whereby said bearing element is normally retained in its extended position.

2. A retractable tail piece for damper regulators comprising a folded sheet metal body portion including a pair of flat damper engaging portions disposed to receive a damper between them, a retractable bearing element, guide means on said folded sheet metal body portion for telescopically receiving said retractable bearing element, a fixed abutment member, a coil spring disposed within said bearing element having one end thereof in contact with said fixed abutment member and the other end thereof in contact with said bearing element whereby said bearing element is normally retained in its extended position, and cooperating frictionally engageable surfaces on said bearing element and said guide means for limiting the outward movement of said bearing element on said guide means whereby said coil spring is maintained under compression to frictionally lock said bearing element in its extended position.

3. A retractable tail piece for damper regulators comprising a folded sheet metal body portion including a pair of flat damper engaging portions disposed to receive a damper between them, a retractable bearing element, guide means on said folded sheet metal body portion for slidably receiving said bearing element, a fixed abutment, means for limiting the axial movement of said bearing element, and a coil spring disposed within said bearing element having one end thereof in contact with said fixed abutment and the other end thereof in contact with said bearing element whereby said bearing element is normally urged to its extended position.

4. A retractable tail piece for damper regulators comprising, a folded sheet metal body portion including a pair of flat damper engaging portions disposed to receive a damper between them, a retractable bearing element, guide means on said folded sheet metal body portion for slidably receiving said bearing element, a fixed abutment member, a coil spring disposed within said bearing element having one end thereof in contact with said fixed abutment member and the other end thereof in contact with said bearing element whereby said bearing element is normally urged to its extended position, and cooperating frictionally engageable surfaces on said bearing elements and said guide means for limiting the amount of movement of said bearing element under the action of said coil spring.

5. A retractable tail piece for damper regulators comprising a folded sheet metal body portion including a pair of flat damper engaging portions, and a pair of semi-cylindrical bearing receiving portions, a cylindrical bearing element slidably guided within said semi-cylindrical portions, a fixed abutment member, and a coil spring disposed between said fixed abutment member and said bearing element whereby said bearing element is normally retained in its extended position.

6. A retractable tail piece for damper regulators comprising a folded sheet metal body portion including a pair of flat damper engaging portions, and a pair of semi-cylindrical bearing receiving portions, a cylindrical bearing element slidably guided within said semi-cylindrical portions, a fixed abutment member, a coil spring disposed between said fixed abutment member and said bearing element whereby said bearing element is normally retained in its extended position and means for limiting the extent of movement of said bearing element whereby said coil spring is maintained under compression.

7. A retractable tail piece for damper regulators comprising a folded sheet metal body portion including a pair of flat damper engaging portions and a pair of semi-cylindrical bearing receiving portions, a hollow cylindrical bearing element slidably guided within said semi-cylindrical portions, a coil spring disposed within said hollow cylindrical bearing element, and means for retaining said coil spring in said bearing element, said coil spring arranged to urge said bearing element to its extended position.

8. A retractable tail piece for damper regulators comprising a folded sheet metal body portion including a pair of flat damper engaging portions and a pair of semi-cylindrical bearing receiving portions, a hollow cylindrical bearing element slidably guided within said semi-cylindrical portions, a longitudinally arranged tapered slot in one of said semi-cylindrical portions, a tapered wedge element on said bearing element receivable in said tapered slot, a coil spring disposed within said hollow cylindrical bearing element, and means for retaining said coil spring in said bearing element, said coil spring arranged to urge said bearing element to its extended position wherein said tapered wedge element engages said tapered slot to frictionally lock said bearing element in its extended position.

ALFRED E. MAAGE, Jr.